(12) United States Patent
Zhang

(10) Patent No.: US 11,658,604 B2
(45) Date of Patent: May 23, 2023

(54) ACTUATOR CONTROL METHOD

(71) Applicant: CHIPSEMI SEMICONDUCTOR (NINGBO) CO., LTD., Ningbo (CN)

(72) Inventor: Yaoguo Zhang, Ningbo (CN)

(73) Assignee: CHIPSEMI SEMICONDUCTOR (NINGBO) CO., LTD., Yuyao (CN)

( * ) Notice: Subject to any disclaimer, the term of this patent is extended or adjusted under 35 U.S.C. 154(b) by 0 days.

(21) Appl. No.: 17/531,553

(22) Filed: Nov. 19, 2021

(65) Prior Publication Data

US 2022/0166367 A1 May 26, 2022

(30) Foreign Application Priority Data

Nov. 20, 2020 (CN) .......................... 202011307906.X

(51) Int. Cl.
*H02P 29/64* (2016.01)

(52) U.S. Cl.
CPC ..................... *H02P 29/64* (2016.02)

(58) Field of Classification Search
CPC ............ H02P 29/64; H02P 29/60; G02B 7/08
USPC .................................................. 318/445, 558
See application file for complete search history.

(56) References Cited

U.S. PATENT DOCUMENTS

| | | | | |
|---|---|---|---|---|
| 5,600,496 A * | 2/1997 | Mori | ..................... | G02B 15/144 |
| | | | | 359/820 |
| 7,974,025 B2 * | 7/2011 | Topliss | ..................... | G02B 7/08 |
| | | | | 359/823 |
| 9,179,066 B1 * | 11/2015 | Tsai | ..................... | H04N 5/23251 |
| 10,048,461 B2 * | 8/2018 | Liu | ......................... | G02B 7/04 |

* cited by examiner

*Primary Examiner* — David Luo
(74) *Attorney, Agent, or Firm* — Javalon Law, PC

(57) ABSTRACT

Embodiments provide controlling an actuator such that inaccurate actuator control caused by the heat created when the actuator moves can be compensated. In some embodiments, a temperature sensor is implemented in an actuator controller outside of the actuator, and the temperature sensor is connected to the actuator through heat conductive materials. In these embodiments, the cost and the form factor of the aforementioned actuator is reduced compared to implementation of temperature sensors within the actuator.

10 Claims, 8 Drawing Sheets

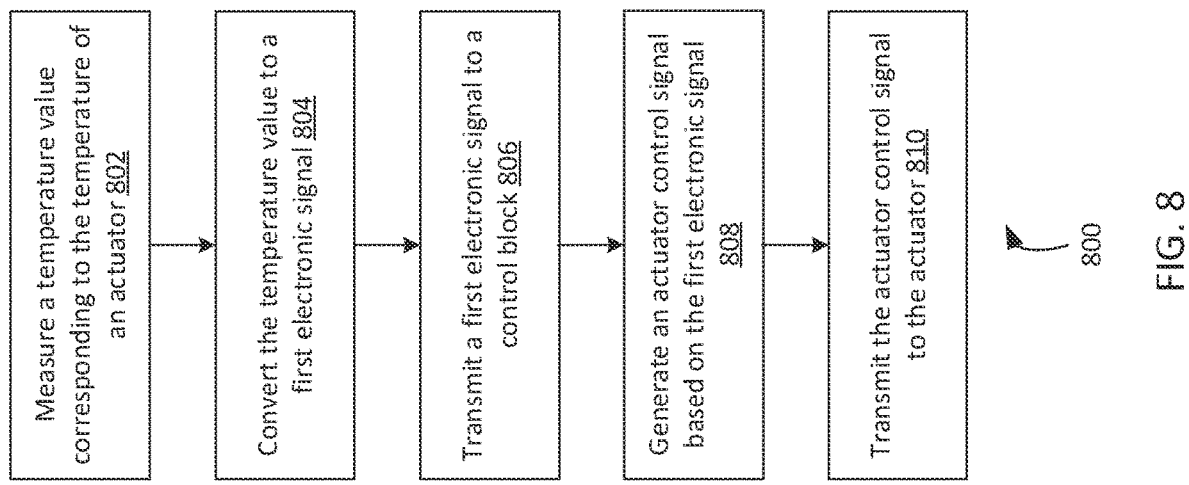

ACTUATOR CONTROL METHOD

FIELD OF THE INVENTION

The present application generally pertains to control of actuator.

BACKGROUND OF THE INVENTION

An actuator is a component of a machine that is responsible for moving and controlling a mechanism or system, for example by opening a valve. An actuator requires a control signal and a source of energy. The control signal is relatively low energy and may be electric voltage or current, pneumatic, or hydraulic fluid pressure, or even human power. The source of energy may be an electric current, hydraulic pressure, or pneumatic pressure. When the actuator receives a control signal, it responds by converting the source of energy into mechanical motion. In the electric, hydraulic, and pneumatic sense, it is a form of automation or automatic control.

BRIEF SUMMARY OF THE INVENTION

In accordance with the present disclosure, a method for controlling an actuator is provided such that inaccurate actuator control caused by the heat created when the actuator moves can be compensated. In some embodiments, a temperature sensor is implemented in an actuator controller outside of the actuator, and the temperature sensor is connected to the actuator through heat conductive materials. In these embodiments, the cost and the form factor of the aforementioned actuator is reduced compared to implementation of temperature sensors within the actuator.

BRIEF DESCRIPTION OF THE DRAWINGS

FIG. 8 illustrates an example method for controlling an actuator based on a temperature value of the actuator measured a temperature sensor.

DETAILED DESCRIPTION OF THE INVENTION

Figure 1:
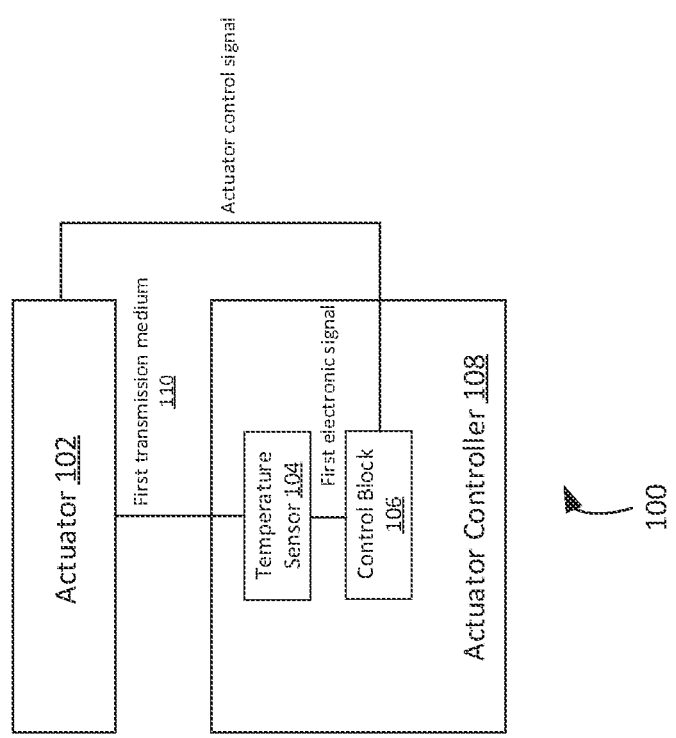
FIG. 1 illustrates an actuator control system 100, according to an exemplary embodiment of the present disclosure.

Particular embodiments of the invention are illustrated herein in conjunction with the drawings.

Various details are set forth herein as they relate to certain embodiments. However, the method can also be implemented in ways which are different from those described herein. Modifications can be made to the discussed embodiments by those skilled in the art without departing from the method. Therefore, the method is not limited to particular embodiments disclosed herein.

An actuator is a mechanism by which a control system acts upon to perform an operation or task. Various types of actuators are used in different applications including mechanical, thermal, electrical, and/or other types of applications. In camera applications, a camera actuator is used to secure focus or stabilize images by rapidly moving a lens within the camera module at high speed. Key functionalities of a camera actuator include autofocus, optical image stabilizer, optical zoom, and/or any other functionalities. As camera systems have become more widespread, improving autofocus accuracy has garnered some attention. The challenge is to control the actuator to move the lens within the camera with high accuracy and high speed to accomplish autofocus.

An actuator can be configured to have magnets attached to it to perform autofocus process in a camera. When an actuator moves, the magnets attached to it create changes in a magnetic field surrounding the actuator. The changes in the magnetic field are then captured by a magnetic field sensor. The magnetic field sensor then converts the captured changes in the magnetic field to electric signals and send the converted electric signals to processing units for further processing. Finally, the processing units process the converted electric signals, generate actuator control signals, and transmit the actuator control signals to the actuator.

One insight provided by the present disclosure is that when an actuator moves in a camera during an autofocus process, the actuator creates heat. The created heat at the actuator may affect accuracy of the electric signals converted at the magnetic field sensor. Inaccurate electric signals converted at the magnetic field sensor would further affect accuracy the control signals generated at the processing units, resulting in inaccurate actuator control. One way to compensate this inaccurate actuator control is to implement temperature sensors within the actuator to measure changes in the temperature. Then the processing units can be used to generate actuator control signals to compensate inaccuracies caused by temperature changes. However, implementation of such temperature sensors within an actuator can drive up a cost of the actuator and a form factor (such as a size) of the actuator.

In accordance with the present disclosure, a method for controlling an actuator is provided such that inaccurate actuator control caused by the heat created when the actuator moves can be compensated. In some embodiments, a temperature sensor is implemented in an actuator controller outside of the actuator, and the temperature sensor is connected to the actuator through heat conductive materials. In these embodiments, the cost and the form factor of the aforementioned actuator is reduced compared to implementation of temperature sensors within the actuator.

FIG. 1 illustrates an actuator control system 100, according to an exemplary embodiment of the present disclosure. In some embodiments, an actuator controller 108 comprises a temperature sensor 104, a control block 106, and/or any other components. The temperature sensor 104 is connected to an actuator 102 through a first transmission medium 110. A temperature sensor 104 may be referred to an electronic device that measures the temperature of its environment and converts input data into electronic data to record, monitor, or signal temperature changes. A control block 106 may be referred to a computer processing unit in the actuator controller 108 that controls operations of the actuator 102 by sending actuator control signals to the actuator 102. Examples of actuator control signals include digitally encoded electronic signals for move forward action, move backward action, move left action, move right action, move up action, move down action, and/or any other types of move actions in the actuator 102. The first transmission medium 110 may be referred to a thermally conductive material that can transfer heat and take up heat from its environment. Examples of a first transmission medium 110 include silver, copper, gold, aluminum nitride, graphite, thermally conductive rubber, and/or any other types of thermally conductive materials.

In this example, heat created in the actuator 102 during its movement is transferred from the actuator 102 to the temperature sensor 104 through the first transmission medium 110. Before the actuator 102 moves, the temperature sensor 104 measures the temperature value at the first transmission medium 110 and converts it to a first electronic signal with value n. A first electronic signal may be referred to an electronic signal that is proportional to the temperature value measured at the temperature sensor 104. Examples of a first electronic signal include analog voltage signal, digital voltage signal, analog current signal, and/or any other types of electronic signals. The first electronic signal is then transmitted from the temperature sensor 104 to the control block 106 for further processing. When the actuator 102 moves, the created heat results in a temperature increase at the first transmission medium 110. This temperature increase is then reflected at the first electronic signal which now has value n+Δn. The updated first electronic signal with the value n+Δn is then transmitted from the temperature sensor 104 to the control block 106. Based on the updated first electronic signal value, the control block 106 is configured to generate an actuator control signal and transmit the actuator control signal to the actuator 102. Algorithm 1 illustrates an example of pseudocode for actuator control signal generation at the control block 106. One skilled in the art understands how to implement such an algorithm in the control block, for example through circuitry logic.

Algorithm 1
Example of pseudocode of actuator control signal generation at the control block 106.

```
INPUT first_electrc_sig
OUTPUT actuator_ctrl_sig
old_sig = first_electrc_sig
WHILE (first_electrc_sig != old_sig):
    /* Determine actuator control signal based on temperature changes */
    actuator_ctrl_sig = actuator_determ(first_electrc_sig, old__sig)
    old_sig = first_electrc_sig
```

As can be seen in Algorithm 1, in this example, the control block 106 is configured to update the actuator control signal based on the increased value Δn in the first electronic signal. In this way, the inaccuracies in actuator control signals caused by the heat in actuator movement can be compensated by an updated actuator control signal generated at the control block 106. Since the temperature sensor 104 and the control block 106 are implemented in the actuator controller 108 outside of the actuator 102, the form factor of the actuator 102 is reduced compared to implementation of the temperature sensor 104 within the actuator 102.

Figure 2:
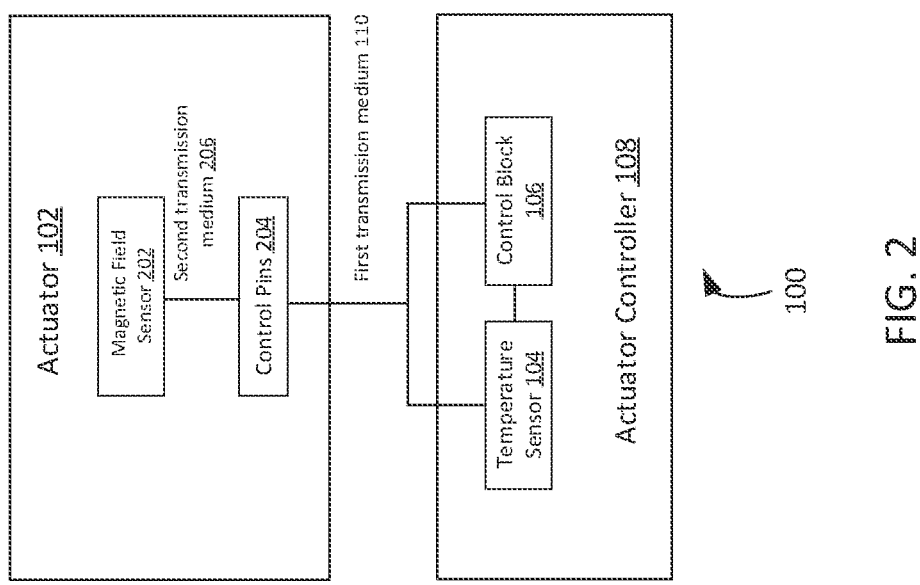
FIG. 2 illustrates another example of the actuator control system 100, according to an exemplary embodiment of the present disclosure.

FIG. 2 illustrates another example of the actuator control system 100, according to an exemplary embodiment of the present disclosure. As can be seen, in this example, the actuator 102 comprises a magnetic field sensor 202, control pins 204, and/or any other components. The actuator controller 108 comprises a temperature sensor 104, a control block 106, and/or any other components. A magnetic field sensor 202 may be referred to a device that measures direction, strength, and/or relative change of a magnetic field at a particular location. Examples of a magnetic field sensor 202 include magneto-diode sensor, magneto-transistor sensor, magnetic tunnel junction magnetometer, magneto-optical sensor, and/or any other types of magnetic field sensor. Control pins 204 may be referred to pronged electrical contacts as part of a signal interface in the actuator 102. Examples of control pins 204 include silver pins, copper pins, gold pins, nickel pins, and/or any other types of control pins.

In this embodiment, the magnetic field sensor 202 is connected to the control pins 204 through a second transmission medium 206. The second transmission medium 206 may be referred to a thermally conductive material that can transfer heat and take up heat from its environment. The control pins 204 are connected to the temperature sensor 104 and the control block 106 through the first transmission medium 110. In this way, the heat created by the actuator 102 during its movement is transferred from the magnetic field sensor 202 to the control pins 204 and in turn to the temperature sensor 104 for further processing.

The first transmission medium 110 in this embodiment is both a thermally conductive material and electrically conductive material. The first transmission medium 110 is used to transfer the heat from the magnetic field sensor 202 to the temperature sensor 104, and to transmit actuator control signals from the control block 106 to the control pins 204. In this way, since the first transmission medium 110 is used for both heat transfer and electrical signal transmission, no additional transmission medium is needed for controlling the actuator 102 from the actuator controller 108. Thus, the form factor of the actuator 102 is reduced compared to implementation of additional signal transmission medium between the actuator 102 and the actuator controller 108.

Figure 3:
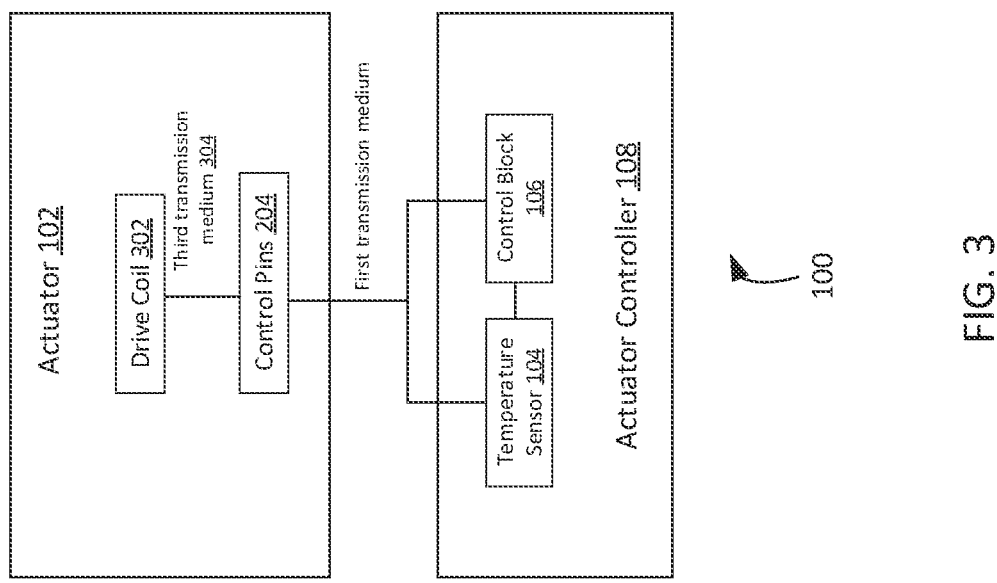
FIG. 3 illustrates yet another example of the actuator control system 100, according to an exemplary embodiment of the present disclosure.

FIG. 3 illustrates yet another example of the actuator control system 100, according to an exemplary embodiment of the present disclosure. As can be seen, in this example, the actuator 102 comprises a drive coil 302, control pins 204, and/or any other components. A drive coil 302 may be referred to a metal coiled wire used to drive alternating current between the magnets attached to the actuator 102 to produce a force capable of moving objects back and forth through a magnetic field. The drive coil 302 is connected to the control pins 204 through a third transmission medium 304. A third transmission medium 304 may be referred to a thermally conductive material that can transfer heat and take up heat from its environment.

In this embodiment, the heat created by the actuator 102 during its movement is transferred from the drive coil 302 to the control pins 204 and in turn to the temperature sensor 104 for further processing. In this way, as a thermally conductive material, the metal coiled wire in the drive coil 302 can reflect temperature changes in the actuator 102 at the temperature sensor 104. Please reference FIG. 1 and FIG. 2 and their associated texts for structure and functions of other components included in this embodiment.

Figure 4:
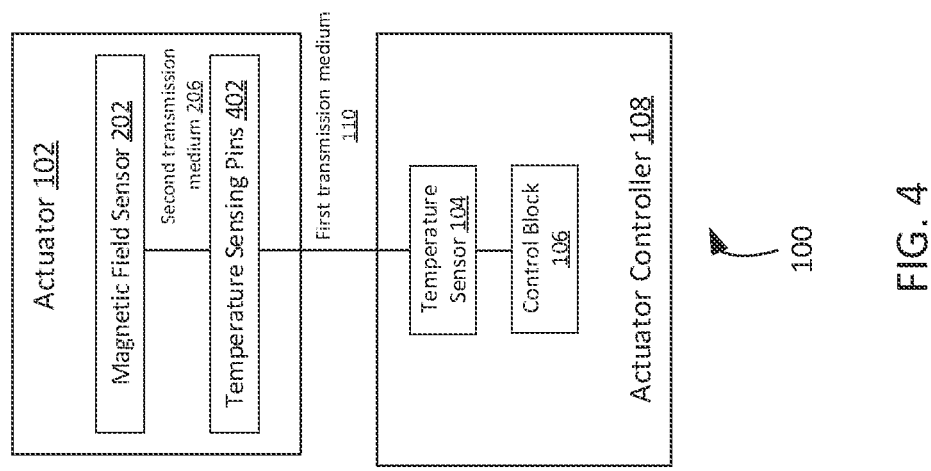
FIG. 4 illustrates yet another example of the actuator control system 100, according to an exemplary embodiment of the present disclosure.

FIG. 4 illustrates yet another example of the actuator control system 100, according to an exemplary embodiment of the present disclosure. As can be seen, in this example, the actuator 102 comprises a magnetic field sensor 202, temperature sensing pins 402, and/or any other components. Temperature sensing pins 402 may be referred to specifically designated metal contacts at the actuator 102 for transferring heat from the actuator 102 to the temperature sensor 104. Examples of temperature sensing pins 402 include silver pins, copper pins, gold pins, nickel pins, and/or any other types of pins.

In this example, the temperature sensing pins 402 are connected to the magnetic field sensor 202 through the second transmission medium 206. In this way, the heat created by the actuator 102 during its movement is transferred from the magnetic field sensor 202 to the temperature sensing pins 402, and in turn to the temperature sensor 104. Since the temperature sensing pins 402 in this example are specifically designated metal contacts for heat transfer, the use of temperature sensing pins 402 does not interfere normal actuator control at control pins 204. Please reference FIG. 1, FIG. 2 and their associated texts for structure and functions of other components included in this embodiment.

Figure 5:
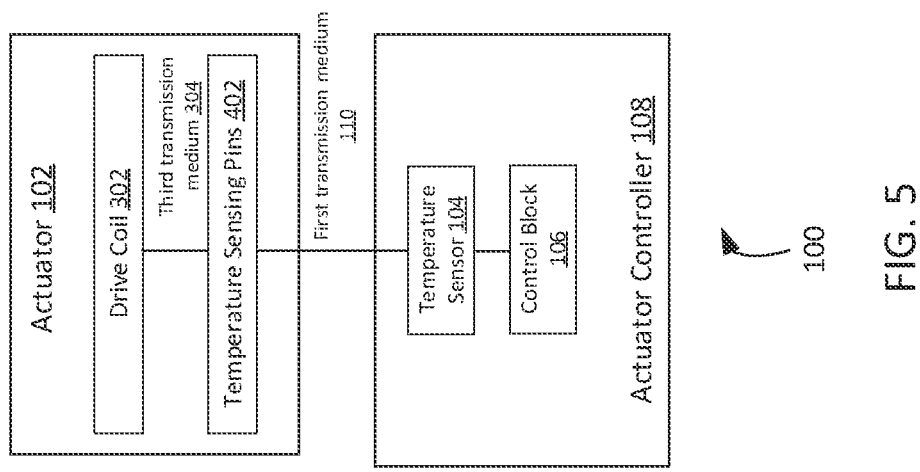
FIG. 5 illustrates yet another example of the actuator control system 100, according to an exemplary embodiment of the present disclosure.

FIG. 5 illustrates yet another example of the actuator control system 100, according to an exemplary embodiment of the present disclosure. As can be seen, in this example, the actuator 102 comprises a drive coil 302, temperature sensing pins 402, and/or any other components. As discussed in the embodiment shown in FIG. 4, the use of specifically designated temperature sensing pins 402 allows the actuator control system 100 to transfer heat from the actuator 102 to the temperature sensor 104 without interfering normal actuator control at control pins 204. Please reference FIG. 1, FIG. 3 and their associated texts for structure and functions of other components included in this embodiment.

Figure 6:
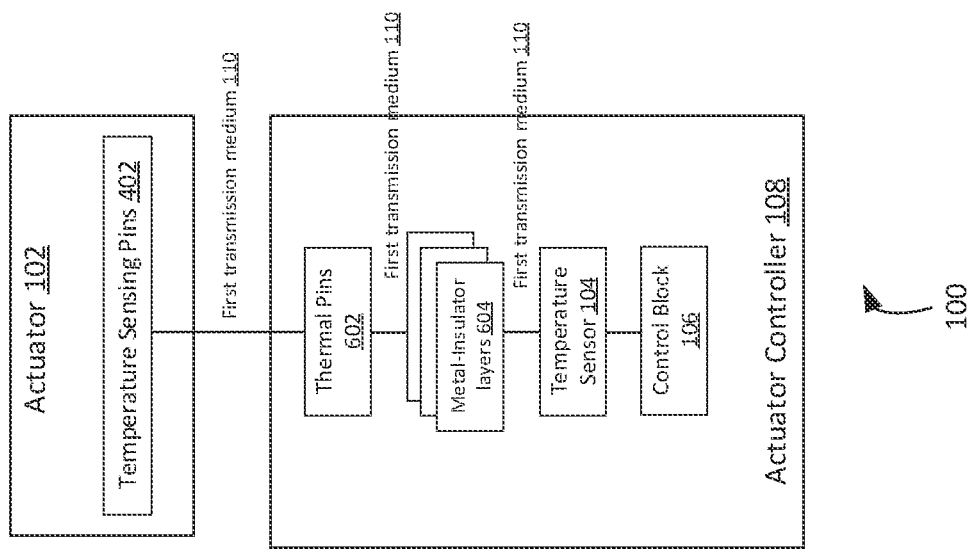
FIG. 6 illustrates yet another example of the actuator control system 100, according to an exemplary embodiment of the present disclosure.

FIG. 6 illustrates yet another example of the actuator control system 100, according to an exemplary embodiment of the present disclosure. As can be seen, in this example, the actuator controller 108 comprises thermal pins 602, metal-insulator layers 604, the temperature sensor 104, the control block 106, and/or any other components. Thermal pins 602 may be referred to specifically designated metal contacts at the actuator controller 108 for transferring heat from the temperature sensing pins 402 to the temperature sensor 104. Examples of thermal pins 602 include silver pins, copper pins, gold pins, nickel pins, and/or any other types of pins. Metal-insulator layers 604 may be referred to a structure of metal/insulator layers wherein metal layers and insulator layers are stacked in an alternate manner.

In this embodiment, the thermal pins 602 are connected to the temperature sensing pins 402 and to the metal-insulator layers 604 through the first transmission medium 110. The metal-insulator layers 604 are connected to the temperature sensor 104 through the first transmission medium 110. In this way, the heat created by the actuator 102 during its movement is transferred from the temperature sensing pins 402 to the thermal pins 602, then to the metal-insulator layers 604, and finally to the temperature sensor 104. The use of specifically designated thermal pins 602 allows the actuator control system 100 to transfer heat from the actuator 102 to the temperature sensor 104 without interfering normal actuator control at the control pins 204. The use of metal-insulator layers 604 provides a higher heat transfer efficiency from the actuator 102 to the temperature sensor 104.

Figure 7:
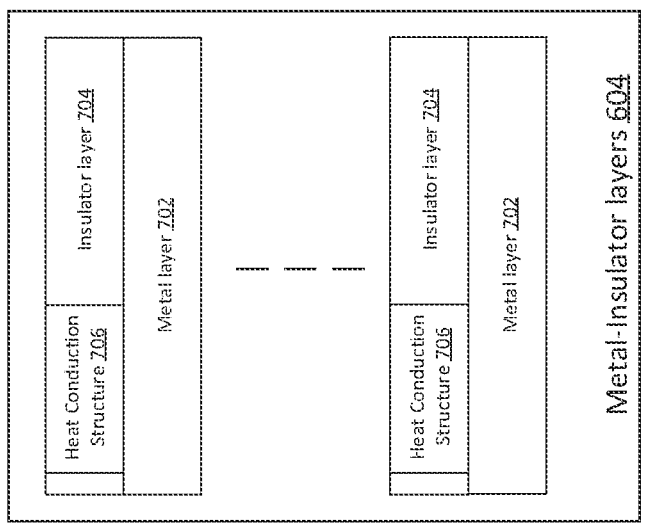
FIG. 7 illustrates an embodiment of metal-insulator layers.

FIG. 7 illustrates another embodiment of the metal-insulator layers 604. As can be seen, in this embodiment, the metal-insulator layers 604 comprise a set of metal layers 702 and insulator layers 704. The metal layers 702 and the insulator layers 704 are stacked in an alternate manner. In some embodiments, the metal layer 702 is a copper layer with a thermal conductivity of 399 watts per meter-kelvin (W/(m·K)). The thermal conductivity of the copper layer allows efficient heat transfer from the metal layer 702 to the adjacent insulator layer 704. In some other embodiments, the number of metal layers 702 and the insulator layers 704 is 5. This number of metal layers 702 and insulator layers 704 can be adjusted based on design need of the actuator controller 108: A higher number of metal layers 702 and insulator layers 704 results in a higher heat transfer efficiency in the metal-insulator layers 604 at the expense of increasing a form factor (such as a size) of the actuator controller 108. A lower number of metal layers 702 and insulator layers 704 results in a decreased form factor (such as a size) of the actuator controller 108, at the expense of decreasing heat transfer efficiency in the metal-insulator layers 604.

In this embodiment, each insulator layer 704 includes a heat conduction structure 706. The heat conduction structure 706 may be referred to a thermally conductive material that can transfer heat and take up heat from its environment. Examples of heat conduction structure 706 include silver, copper, gold, aluminum nitride, graphite, thermally conductive rubber, and/or any other types of thermally conductive materials. The heat conduction structure 706 in each insulator layer 704 is connected to adjacent metal layers 702 to facilitate heat transfer. In some embodiments, the insulator layers 704 include holes filled with the heat conduction structure 706. In these embodiments, the heat conduction structure 706 is connected to adjacent metal layers 702 to facilitate heat transfer. The specific metal-insulator layer structure in the metal-insulator layers 604 provides high heat transfer efficiency from the actuator 102 to the temperature sensor 104.

FIG. 8 illustrates an example method 800 for controlling the actuator 102 based on a temperature value of the actuator 102 measured at the temperature sensor 104. The operations of method 800 presented below are intended to be illustrative. In some embodiments, method 800 may be accomplished with one or more additional operations not described and/or without one or more of the operations discussed. Additionally, the order in which the operations of method 800 are illustrated in FIG. 8 and described below is not intended to be limiting.

At a 802, a temperature value corresponding to the temperature of the actuator 102 is measured. As mentioned, in some embodiments, the temperature value of the actuator 102 is measured at the temperature sensor 104 by connecting the actuator 102 to the temperature sensor 104 through a first transmission medium 110.

At a 804, the temperature value measured at 802 is converted to a first electronic signal at the temperature sensor 104. In some embodiments, the temperature sensor 104 converts the temperature value measured at 802 to an analog voltage signal proportional to the measured temperature value.

At a 806, the temperature sensor 104 transmits a first electronic signal to the control block 106. In some implementations, a change in the temperature of the actuator 102 results in a change in the first electronic signal transmitted to the actuator 102.

At a 808, the control block 106 generates an actuator control signal based on the first electronic signal transmitted from the temperature sensor 104. In some implementations, the actuator control signal is generated to compensate temperature changes caused by the heat created at the actuator 102 during its movement.

At a 810, the control block 106 transmits the actuator control signal to the actuator 102. In some embodiments, the actuator control signal comprises directional movement commands to move the actuator 102 for compensating actuator movement inaccuracies caused by the heat created by the actuator 102 during its movement.

Though the method for controlling an actuator is disclosed by way of specific embodiments as described above, those embodiments are not intended to limit the present method. Based on the methods and the technical aspects disclosed herein, variations and changes may be made to the presented embodiments by those of skill in the art without departing from the spirit and the scope of the present method.

What is claimed is:

1. A method for controlling an actuator based on a temperature value measured at the actuator, and the method comprising:
   measuring, at a temperature sensor configured in an actuator controller, the temperature value at the actuator by connecting the actuator to the temperature sensor through a first transmission medium;
   converting, at the temperature sensor, the temperature value at the actuator to a first electronic signal;
   transmitting, at the temperature sensor, the first electronic signal to a control block configured in the actuator controller;
   generating, at the control block, an actuator control signal based on the first electronic signal; and
   transmitting, at the control block, the actuator control signal to the actuator; and, wherein
   the actuator further comprises a magnetic field sensor and control pins, the magnetic field sensor being connected to the control pins through a second transmission medium, and the control pins being connected to the temperature sensor and the control block through the first transmission medium, and wherein the measurement of the temperature value is based on heat transferred by the magnetic field sensor through the second transmission medium.

2. The method in claim 1, wherein the actuator further comprises a drive coil, the drive coil being connected to the control pins through the second transmission medium, and the control pins being connected to the temperature sensor and the control block through the first transmission medium and wherein the measurement of the temperature value is based on heat transferred by the drive coil through the second transmission medium.

3. The method in claim 1, wherein the actuator further comprises temperature sensing pins,
   the temperature sensing pins being connected the temperature sensor through the first transmission medium and wherein the measurement of the temperature value is based on heat transferred b through temperature sensing pins.

4. The method in claim 1, wherein the actuator controller further comprises thermal pins,
   the thermal pins being connected to the temperature sensor through metal-insulator layers and wherein the measurement of the temperature value is based on heat transferred b through temperature sensing pins.

5. The method in claim 4, wherein the metal-insulator layers comprise one or more metal layers and one or more insulator layers, the metal layers and insulator layers being stacked in an alternate manner, and each insulator layer includes one or more heat conduction structures for heat transfer.

6. An actuator control system for controlling an actuator based on a temperature value measured at the actuator, and the actuator control system comprising a temperature sensor, and a control block, wherein
   the temperature sensor is configured to:
      measure the temperature value at the actuator by connecting the actuator to the temperature sensor through a first transmission medium; and
   convert the temperature value at the actuator to a first electronic signal; and
      transmit the first electronic signal to a control block configured in the actuator controller; and
   the control block is configured to:
      generate an actuator control signal based on the first electronic signal; and
   transmitting the actuator control signal to the actuator and, wherein the actuator further comprises a magnetic field sensor and control pins, the magnetic field sensor being connected to the control pins through a second transmission medium, and the control pins being connected to the temperature sensor and the control block through the first transmission medium and wherein the measurement of the temperature value is based on heat transferred by the magnetic field sensor through the second transmission medium.

7. The method in claim 6, wherein the actuator further comprises a drive coil, the drive coil being connected to the control pins through the second transmission medium, and the control pins being connected to the temperature sensor and the control block through the first transmission medium and wherein the measurement of the temperature value is based on heat transferred by the drive coil through the second transmission medium.

8. The method in claim 6, wherein the actuator further comprises temperature sensing pins, the temperature sensing pins being connected the temperature sensor through the first transmission medium and wherein the measurement of the temperature value is based on heat transferred through temperature sensing pins.

9. The method in claim 6, wherein the actuator controller further comprises thermal pins,
   the thermal pins being connected to the temperature sensor through metal-insulator layers and wherein the measurement of the temperature value is based on heat transferred b through temperature sensing pins.

10. The method in claim 9, wherein the metal-insulator layers comprise one or more metal layers and one or more insulator layers, the metal layers and insulator layers being stacked in an alternate manner, and each insulator layer includes one or more heat conduction structures for heat transfer.

* * * * *